United States Patent [19]

Péclat et al.

[11] Patent Number: 5,719,461
[45] Date of Patent: Feb. 17, 1998

[54] PIEZOELECTRIC MOTOR HAVING AN ARRANGEMENT WHICH PROVIDES INFORMATION RELATIVE TO THE ROTOR POSITION AND/OR THE ROTOR'S NUMBER OF REVOLUTIONS

[75] Inventors: Christian Péclat, Neuchâtel; Kaspar Trümpy, Soleure, both of Switzerland

[73] Assignee: Eta Fabriques d'Ebauches, Grenchen, Switzerland

[21] Appl. No.: 575,733

[22] Filed: Dec. 18, 1995

[30] Foreign Application Priority Data

Dec. 29, 1994 [CH] Switzerland .............. 03953/94

[51] Int. Cl.$^6$ ................................ H01L 41/08
[52] U.S. Cl. ............................. 310/323; 310/316
[58] Field of Search .................. 310/321, 323, 310/328, 316, 317

[56] References Cited

U.S. PATENT DOCUMENTS

| | | | |
|---|---|---|---|
| 4,400,641 | 8/1983 | Vishnevsky et al. | 310/323 |
| 4,453,103 | 6/1984 | Vishnevsky et al. | 310/323 |
| 4,634,916 | 1/1987 | Okada et al. | 310/323 |
| 4,814,660 | 3/1989 | Yamada et al. | 310/328 |
| 4,959,580 | 9/1990 | Vishnevsky et al. | 310/323 |
| 5,028,832 | 7/1991 | Iwao et al. | 310/323 |
| 5,237,237 | 8/1993 | Ueda et al. | 310/323 |
| 5,296,776 | 3/1994 | Wind et al. | 310/323 |
| 5,332,941 | 7/1994 | Honda | 310/323 |
| 5,521,455 | 5/1996 | Miyazawa et al. | 310/323 |

OTHER PUBLICATIONS

Patent Abstracts of Japan vol. 18, No. 595 (E–1630), 14 Nov. 1994 & JP–A–06 225550 (Seiko Instr Inc) 12 Aug. 1994.

Patent Abstracts of Japan vol. 15, No. 258 (E–1084), 18 Jun. 1991 & JP–A–03 082380 (Shinji Kawase) 8 Apr. 1991.

*Primary Examiner*—Mark O. Budd
*Attorney, Agent, or Firm*—Griffin, Butler Whisenhunt & Kurtossy

[57] ABSTRACT

Along the inner lying rotor trailing surface (21) of an annular rotor (20) are successively provided regions (26a–c) of small wall thicknesses (29) and regions (25a–c) of larger wall thicknesses, which differ with respect to the acoustic impedance spectrum. During the state of operation, i.e. when the rotor (20) turns, the mentioned regions (24a–c; 25a–c) are excited alternately by the piezoelectric excitor (15) of the stator (13). The acoustic impedance spectrum which changes periodically, influences the electrical impedance spectrum of the motor (10) in an analog manner. These changes are measured via the voltage supply connections of the motor (10) and are interpreted as relative positional changes between the stator (13) and the rotor (20).

13 Claims, 3 Drawing Sheets

PIEZOELECTRIC MOTOR HAVING AN ARRANGEMENT WHICH PROVIDES INFORMATION RELATIVE TO THE ROTOR POSITION AND/OR THE ROTOR'S NUMBER OF REVOLUTIONS

FIELD OF THE INVENTION

The present invention concerns a piezoelectric motor having two elements forming a stator and a rotor, at least the first of said elements having means for generating vibrator waves which set at least an active portion of an active region of the first element into cyclic motion, and this cyclic motion of the active portion of said first element having an effect on at least a passive portion of the second element, so that a relative movement between these two elements is brought about.

Such a motor is based on the reciprocal piezoelectric effect. With this, a piezoelectric excitor is excited by an alternating voltage and a stator is set into a mechanical vibration at an, for example, ultrasonic frequency. By way of appropriate constructional measures, the vibration of the stator allows for a rotational movement of the rotor. As motors of the art have an asynchronous behaviour, an additional arrangement needs to be provided so as to allow to obtain the rotor position and its number of revolutions (revs).

BACKGROUND OF THE INVENTION

U.S. Pat. No. 5,296,776 discloses a piezoelectric motor having a stator provided with a fixedly attached printed circuit having contact extending in a radially outwardly manner. The rotor is provided with a brushing arm, so that by way of this arrangement information concerning the rotor position and its revs is available exterior to this motor.

Experience with the operation of such arrangements have shown, despite fundamental functional ability, that its mechanical friction reduces the life-time of the entire motor and also considerably increases the manufacturing costs. Furthermore, in particular for small motors, the additional place which is needed and the reduction of the operation effectiveness through the friction of the contacts play an important role.

Optical arrangements are also known, which, by way of lightbeams, determine the rotor position and/or the rotor revs.

For such a solution too, the cost and the additional elements in the motor and the therewith associated manufacturing costs are considerable. Also, this arrangement leads to an increase of the motor dimensions, in particular for small motors, as well as a reduction of the operation effectiveness through the additional energy consumption needed to supply lightbeams.

SUMMARY OF THE INVENTION

An object of the present invention is to provide a piezoelectric motor having an arrangement which provides reliable information relative to the rotor position and/or its revs, thereby avoiding notable friction and thus allowing a long life-time, avoiding large motor dimensions, requiring a minimal additional energy consumption and being simple and cheap to manufacture.

Thanks to the inventive solution, information relative to the rotor position as well as the rotor revs may be obtained directly and reliably by way of the voltage supply contacts of the motor. For arriving at this goal, the motor does not need any additional elements, so that the life-time of the motor will not be negatively influenced, and its dimensions remain unchanged. Only simple minor changes to the rotor as well as to the voltage-supply arrangement are needed.

According to a preferred embodiment, the rotor may have for example regions having slits with circular segments, which, when considered locally, are characterised by a different value of the acoustic impedance, than is the case for solid material regions. In this way, during operation at least one electrical variable of the voltage-supply changes, which functions as a carrier of position and/or of revs information. The provided slits do not require any additional manufacturing costs, as they may be obtained, for example, simultaneously with the rotor during the injection moulding thereof.

A first advantageous voltage supply and measuring arrangement controls the frequency according to a constant, preferably zero, phase between the supply voltage and the supply current and interprets the temporal non-uniform periodical changing course of the frequency as being a changement of the position of the rotor relative to the stator. This supply and measuring arrangement is of a simple construction and requires only minor additional costs.

In a second advantageous solution, the piezoelectric motor provides an operation frequency, which during operation, also has a temporal non uniform periodic changing course due to the slits, and which is measured by the supply and measuring arrangement which interprets this as a changing rotor position and/or rotor revs. This solution allows for a favourable operation relative to the operational effectiveness and also has a very low cost.

BRIEF DESCRIPTION OF THE DRAWINGS

The invention is described hereafter by way of several embodiments, thereby referring to the attached drawings in which:

FIG. 2b shows a cross-section of a second embodiment of a rotor according to the line IIb—IIb of FIG. 2a;

DESCRIPTION OF THE PREFERRED EMBODIMENTS

Figure 1:
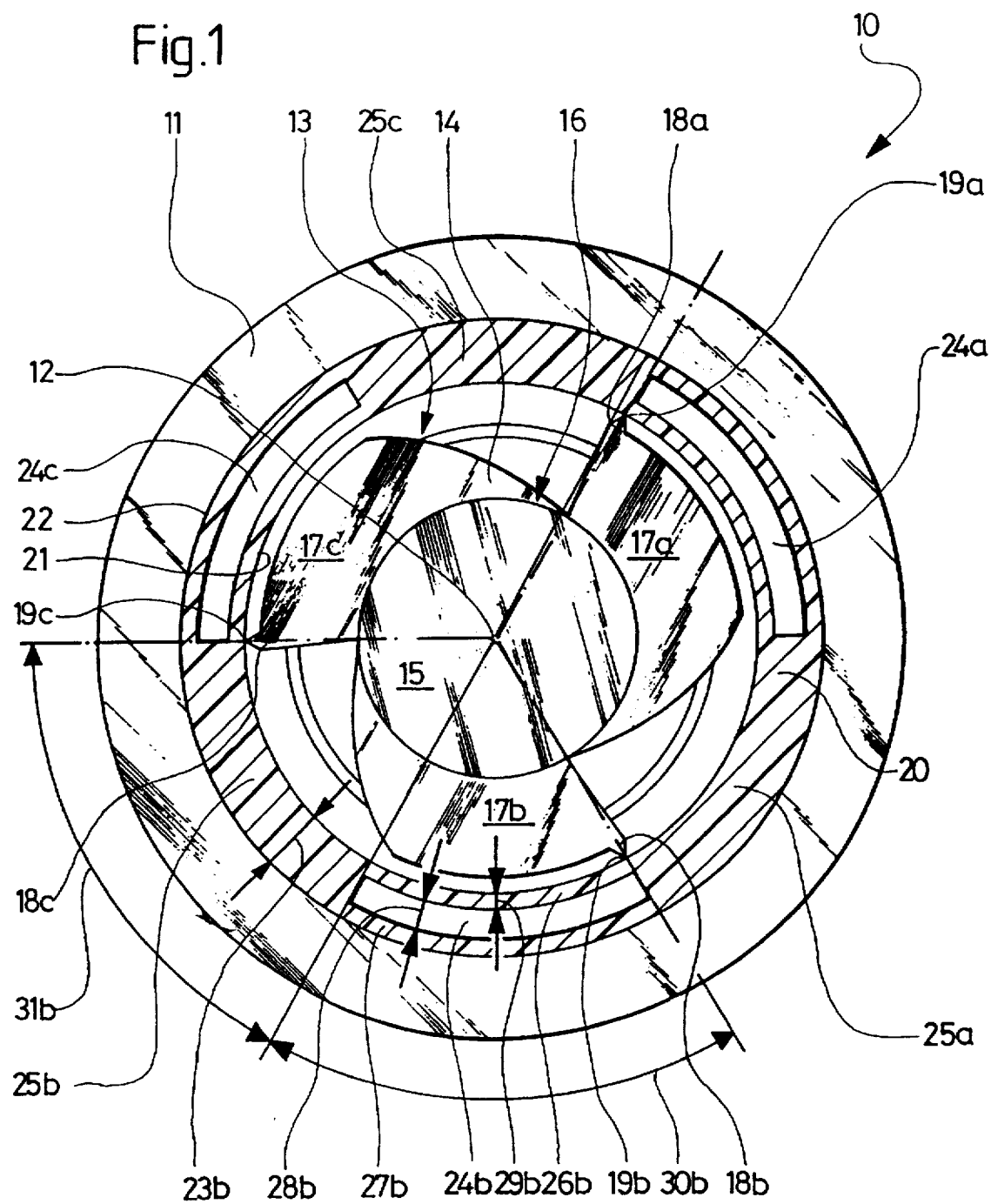
FIG. 1 shows a first embodiment of a piezoelectric motor having a rotor which is cut ortogonally to the axis of rotation.

FIG. 1 shows the first embodiment of the piezoelectric motor 10 which will not be described in full detail hereinafter. For constructional details which are not directly related to the invention, reference is made to the first embodiment shown in FIGS. 1 and 2 of the above-mentioned document U.S. Pat. No. 5,296,776. This applies for example for the stator.

The piezoelectric motor 10 is fixedly attached to a circular base plate 11. In its centre, an axis of rotation 12 is defined, which will be used hereinafter as reference axis.

A flat formed stator 13 is rigidly fixed to the base plate 11 and consists in principal of a resonance plate 14 to which is fixedly held, for example glued, a circular piezoceramic excitor 15 of which the electric supply connections are not shown. The excitor 15 may be manufactured of a ceramic material. Resonance plate 14 includes a circular region 16 which is covered by excitor 15 and from which three resonance wings 17a, 17b, 17c extend outwardly thereby providing the stator with a propeller look.

On each of these three resonance wings 17a–c is formed an outwardly pointing chisel-shaped resonance-tooth 18a, 18b, 18c, which leads geometrically to a line, which is parallel to axis of rotation 12. In reality, however, the result is not really a line, but a small zone. Such resonance teeth 18a–c are each provided with so-called push-portions 19a, 19b, 19c, which form a segment of a cylinder jacket relative to axis of rotation 12.

Against these push-portions 19a–c lies a ring shaped rotor 20, movably arranged on base plate 11, and having an inner cylinder jacket shaped trailing surface 21. Trailing surface 21, together with an exterior surface 22 which is concentric to the rotor trailing surface, define a rotor width 23 which lies between them.

Three identical slits 24a, 24b, 24c which traverse rotor 20 and have a form of a circular section are separated one from the other by three identical solid material regions 25a, 25b, 25c. Slit 24b and solid material region 25b which are representative for all three slits 24a–c and all three solid material regions 25a–c, will be described hereinafter, in which the description is relative to axis of rotation 12.

Slit 24b divides rotor 20 locally into an inner thin rotor region 26b and an outer rotor region 27b. Slit 24b has a width 28b and inner rotor region 26b has a width 29b which are measured along a radial direction. Slit 24b extends along an angle 30b and solid material region 25b extends along an angle 31b, both angles measuring 60°.

The inventive piezoelectric motor 10 operates as follow when piezoceramic excitor 15 is supplied with, for example, a sinusoidal voltage of 200 kHz.

The ultrasound vibrations which are radially transmitted outwardly by piezoceramic excitor 15 into the resonance wings 17a–c result in a cyclic, almost elliptical movement of the three resonance teeth 18a–c and of their push-portions 19a–c in a plane which is orthogonal to axis of rotation 12. Due to this movement, rotor 20 is driven jerkily. For a more detailed description of the driving principal of the piezoelectric motor 10, reference is made to the above-mentioned document U.S. Pat. No. 5,296,776, although the number of resonance wings there is different. With the three wings, however, a distinct driving effect is obtained.

The way in which resonance wings 17a–c respectively resonance teeth 18a–c vibrate with their push-portions 19a–c, depends, amongst other, on the construction, i.e. on the constructional measures of the adjacent rotor 20 which functions as a load. The vibrational behaviour of motor 10 as a whole or also partly, as for example regions of rotor 20, may be described by way of a physical variable, the acoustical impedance.

Only one single value of the acoustic impedance at a certain frequency or also the variation of the acoustic impedance as a function of the frequency for a certain bandwidth is to be considered. In the whole of the text and the claims, the definition of the acoustic impedance spectrum is used for the variation of the acoustic impedance as a function of the frequency.

This definition relates thus specifically to the acoustic impedance frequency diagram and not to the acoustic impedance time diagram. Furthermore, there is only then a question of two separate different acoustic impedance spectrum when these have at least one impedance value at a certain frequency which is different one from the other. For this case it is irrelevant whether the graph of the acoustic impedance spectrum varies continuously within the considered bandwidth, or shows gaps or only consists of several distinct points.

As the piezoelectric motor 10 is supplied electrically, from the point of view of the voltage supply the motor seems to be an electric impedance describing its behaviour as a load. As such, only one single value of the electric impedance at a certain frequency need be considered but also the variation of the electric impedance as a function of the frequency within certain bandwidth may be considered. In the whole of the description as well as the claims, the definition of the electric impedance spectrum will be used for the variation of the electric impedance as a function of the frequency, in analogue to the above-mentioned case for the acoustic impedance spectrum. In the following, the electric impedance is considered from the point of view of the voltage supply source.

There is a close relation between the acoustic and the electric impedance. Changes of the acoustic impedance spectrum influences the electric impedance spectrum. This relative relationship is however not important for the present invention. The inventive solution relies on the fact that the acoustic impedance spectrum is transferred in an equivalent manner to the electric impedance spectrum which is measured by way of non shown motor connections.

In this case however, only those regions of rotor 20 have an influence on the acoustic impedance spectrum which are in the direct vicinity of the push-portions 19a–c, i.e. only those regions of rotor 20 which are in the vicinity and which, are excited directly by push-portions 19a–c. Rotor 20 is provided with several successive regions, which when locally considered, are characterized by different acoustic impedance spectrum, so that also the electric impedance spectrum of the entire motor 10 varies depending on the relative position between stator 13 and rotor 20. The rotor which is shown in U.S. Pat. No. 5,296,776 is, however, completely rotationally symmetric, so that the electric impedance spectrum does not vary depending on the rotor position. Variations of the electric impedance spectrum, for a rotating rotor 20, may be determined by a simple measurement arrangement, which also supplies motor 10, and which interprets the rotor-position and/or its revs. Several possible supply and measuring arrangements will be described later.

The acoustic impedance spectrum of vibrating elements depends fundamentally on their inertia, their elasticity and on their inner frictions. By way of suitable construction measures, these three values may be varied specifically along the rotor trailing surface 21. The inner friction losses are, however, to be kept as small as possible, so that the operation efficiency will not be diminished. Therefore, only the varying values of the inertia and elasticity along the rotor trailing surface 21 are to be considered. According to FIG. 1, the slits 24a–c in rotor 20 produce thin inner rotor regions 26a–c having a smaller width 29a–c, which are not as stiff respectively elastic as the solid material regions 25a–c. These different features result in a different electric impedance spectrum. The outer regions 27a–c provide for a sufficient stability of rotor 20, without reducing the desired specific vibration characteristics of the inner regions 26a–c, which themselves are clearly distinguishable from those of the solid material regions 25a–c.

As the slits 24a–c and the solid material regions 25a–c extend along an angle 30a–c, respectively 31a–c of 60°, either all three slits 24a–c or all three solid material regions 25a–c are in the immediate vicinity of the three push-portions 19a–c. Therefore, as all three push-portions 19a–c are subject to the same operation conditions, the overlapping of their separate functioning results in an amplified total functioning, i.e. in conclusion during operation to a distinct variation of the values of the electrical impedance for the operation frequency, respectively to a distinct variation of the electric impedance spectrum. In the above case this resolution is of one to three, i.e. for one rotation of rotor 20 there occurs alternatively three times a first and three times a second electric impedance spectrum. In other words, the electric impedance reaches, at its operation frequency, three times a maximum value and three times a minimum value. Therefore, by continuous counting of these extreme values the revs or, starting from an initial position, the position of the rotor may be obtained. The proposed resolution of one to three is sufficient for most applications.

The outer rotor regions 27a–c provide rotor 20 substantially with a stability which it would have without slits 24a–c.

Instead of the electric impedance spectrum, the electric admittance spectrum may of course also be considered, the latter being reciprocal with respect to the first. Several local minima may be found along the frequency scale of the electric impedance spectrum, which are designated as modes. For each of these modes, a specific deformation of resonance plate 14 occurs. For a specific mode, a very distinct deformation may occur, which however only acts in a radial or in an axial direction, i.e. push-portions 19a–c only vibrate in a radial direction which means that no driving of rotor 20 results. The choice of appropriate modes thus depends substantially on the largest possible driving effect, i.e. on the largest possible number of revolutions of rotor 20. The chosen mode will be called hereafter the ground mode. When the supply voltage increases and its temperature increases too, this ground mode decreases only slightly by several kHz. Further, the influence of the air pressure is also very small on this ground mode.

In order to obtain a good working operational efficiency, it is very important to choose the shape of the resonance plate 14 in such a way that the frequency scale which is in the immediate vicinity of the ground mode does not contain any further local impedance minima. Only that resonance having the greatest driving effect should be chosen. All other modes, including those asymmetrical ones relative to the three resonance wings 17a–c, will lead, when using a pulse drive, to increased losses, which may be for modes of higher frequency extremely large. Furthermore, a preferably similar value of the acoustic impedance of excitor 15 and of resonance plate 14 at a predetermined frequency will have a positive influence on the total operational efficiency. Thanks to the inventive embodiment of stator 13, and in particular of resonance plate 14, and of rotor 20 all mentioned requirements may be fulfilled.

In general, all modes are characterized not only by the local impedance minimum but also by the zero phase-crossing. While aiming to obtain a largest possible operational efficiency, a minor phase shift caused by the static capacity of excitor 15 may be compensated byway of an additional parallel connected inductivity.

There are also modes which lead to a reversed sense of rotation of rotor 20. Therefore, by changing the frequency of the supplied voltage, respectively of the lead signal 49, the sense of rotation of the motor may be changed. As such the requirements for a bi-directional motor are fulfilled.

Figure 2A:
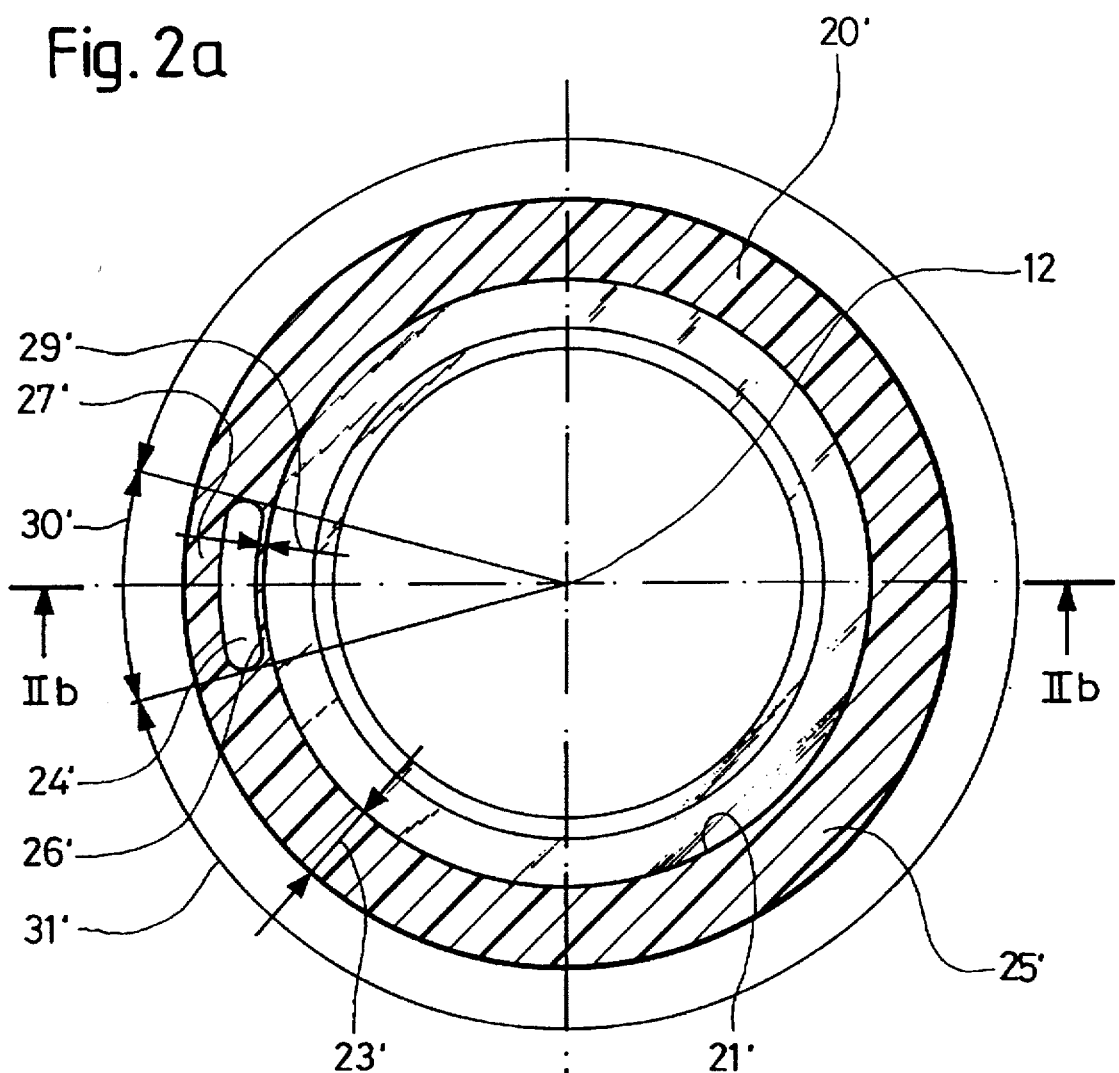
FIG. 2a shows a top view of a second embodiment of the rotor cut along the line IIa—IIa of FIG. 2b.
Figure 2B:
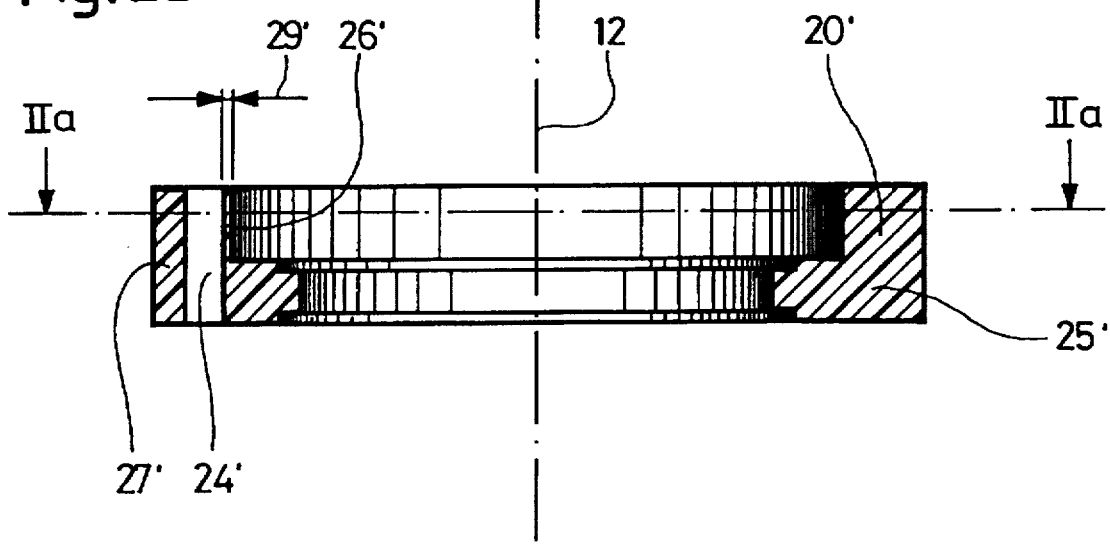

Rotor 20 of piezoelectric motor 10 as shown in figure 1 may be replaced by a rotor 20' which is shown as a second embodiment in FIGS. 2a and 2b. Hereafter, the difference between rotor 20' relative to rotor 20 will be specifically discussed.

Rotor 20' having a width 23' and a rotor trailing surface 21' only contains one slit 24' and, correspondingly, only one solid material region 25'. Slit 24' also traverses rotor 20' as can be seen in FIG. 2b, and this along an angle of 20°, referenced by numeral 30' and thus locally divides rotor 20, into an inner rotor region 26' and an outer rotor region 27'. Rotor region 26' which extends along slits 24' on the inner side of the rotor has a width 29' which, when measured in a radial direction, is clearly smaller when compared to width 29a–c of the first embodiment. The solid material region 25' extends along an angle 31' of 340°.

The functioning of a piezoelectric motor 10 having a rotor 20' as shown in FIGS. 2a and 2b differs from the one shown in FIG. 1 as follows.

As rotor 20' only has one slit 24', at the most only one of the push-portions 19c will be in the vicinity of slit 24'. The influence of this slit 24' on the acoustic as well as on the electric impedance spectrum will thus be smaller than with the piezoelectric motor 10 of FIG. 1 for which all three push-portions 19a–c always vibrate under the same circumstances. However, in the case according to FIG. 2, the influence of this one slit 24' may be increased thanks to the thinner part of inner rotor region 26', i.e. thanks to the smaller width 29'. Under these circumstances, slit 24' may even be of a smaller construction, i.e. the angle 30' may be, for example compared to angle 30a–c of FIG. 1 only 20°. Decisive is that thus two sufficiently different electric impedances are obtained. By using rotor 20', or a similar rotor, the electric impedance spectrum will change in such a manner, that the impedance minimum and the phase zero-crossing on the frequency scale will occur at an operation frequency which will have varied by one percent, this being sufficient to be detected.

Figure 3:
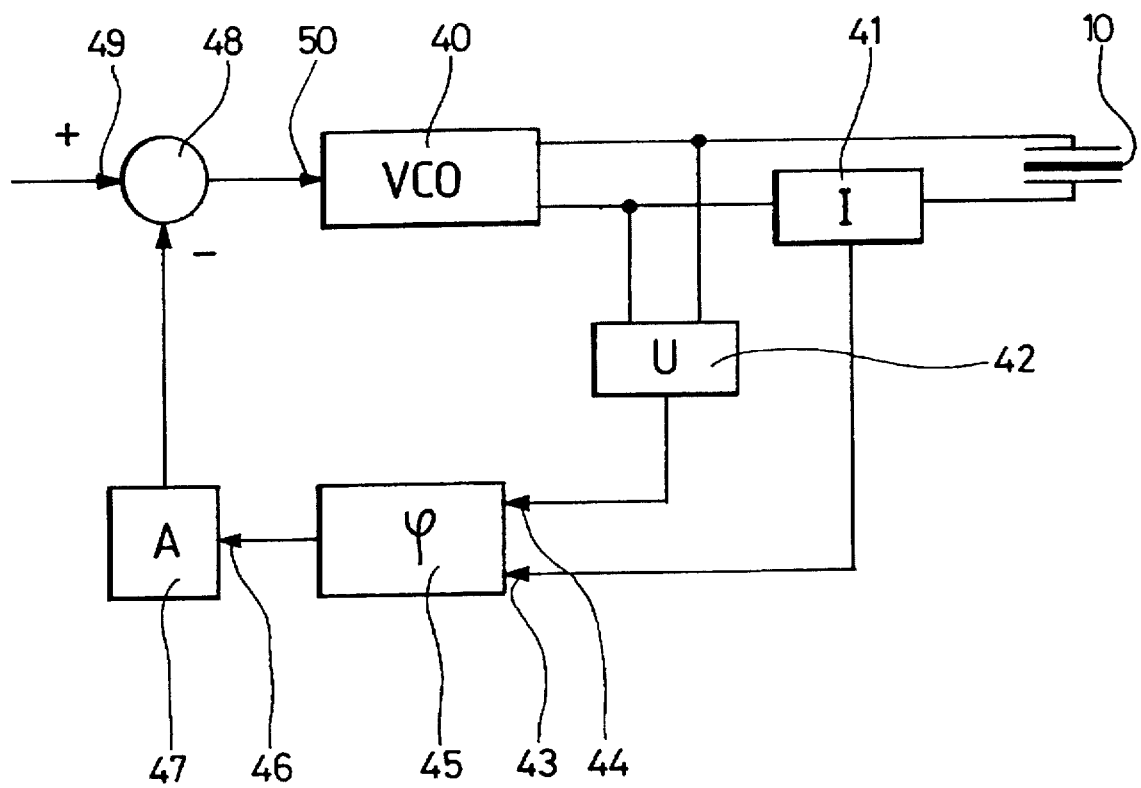
FIG. 3 shows the block diagram of a first supply and measuring arrangement.

FIG. 3 shows the block diagram of a first supply and measuring arrangement for an inventive motor by way of a closed control loop, in which only the motor current loop has been shown as an electric connection loop. A controller, for example a voltage controlled oscillator (VCO), is realised byway of a voltage controller which is referenced by 40 and which is connected at its output side to piezoelectric motor 10. In series to this is connected current measuring-unit 41 and parallel to this a voltage measuring-unit 42 is provided. Each unit 41 and 42 delivers a measuring signal 43 and 44 respectively which are lead to a phase measuring-unit 45. At the output side of this phase measuring-unit 45, a feedback signal 46 leads, via an amplifier 47, to a comparator 48. Comparator 48 has a further input signal which is a leading signal 49. At the output side of comparator 48, a control deviation signal 50 is defined which leads to the input of controller 40.

Such a voltage and measuring arrangement controls the frequency of the alternating voltage so that the voltage and the current are always in phase. VCO controller 40 receives from comparator 48 the leading signal 49 as a direct current signal which has a certain peak level, and provides on its output side the sinusoidal alternating voltage of a determined frequency to piezoelectric motor 10. Here, current measuring-unit 41 measures the momentary value of the current and voltage measuring-unit 42 measures the momentary value of the voltage. Both units provide a proportional measuring signal 43 respectively 44 to phase measuring-unit 45, which-determines the phase difference between the signals and which then provides an equivalent feedback signal 46 via amplifier 47 to comparator 48. Comparator 48 compares the amplified feedback signal 46 with the original leading signal 49 and produces the control deviation signal 50 for the VCO controller 40.

In this way, during operation, the frequency of the supply voltage delivered to motor 10 is corrected thanks to the phase difference between this voltage and the current, i.e. the frequency of the sinusoidal voltage supply varies periodically during operation of motor 10. In other words, the influence of slits 24a–c, respectively 24' on the frequency of the local impedance minima and of the phase zero-crossing is thus complied with, provided that the operation frequency always follows the periodic deviation of the ground mode along the frequency scale, so that the optimal operation point is maintained. The periodic changing of the frequency during the operation of motor 10 caused by the slits 24a–c, respectively 24' and which allows to determine the rotor position and/or its number of revolutions, can be measured for example in the following three ways.

The direct voltage signal 50 is compared in a comparator to an applied reference direct voltage signal. The difference between these two voltages determines the deviation of the frequency of the supply voltage with respect to a reference frequency.

The second possibility consists in providing a time measuring arrangement, which measures the time difference between zero-crossings of the alternating supply voltage and thus allows to determine the momentary frequency.

In a third possibility, the number of zero crossings during a certain interval of time are counted. This variant is advantageous when incorporated in a quartz clock, because here the quartz frequency of 32 kHz allows in a simple manner to obtain a time interval of several milli-seconds. The corresponding circuit may easily be constructed and is robust.

In the following, two further voltage supply and measuring arrangements are shown, without reference to figures, by way of example, which again are to supply a piezoelectric motor of the art, so as to determine from the electric impedance spectrum the rotor position respectively the number of revolutions.

A second voltage supply and measuring arrangement corresponds to a control system with an open loop. It supplies motor 10 with an alternating voltage of a fixed frequency and measures the current fluctuations caused by the changing acoustic impedance of rotor 20, respectively 20'. This solution is suitable in particular for cases with a constant load. In principal it is also possible to supply the motor with a constant alternating current and to register the voltage fluctuations.

A third voltage supply and measuring arrangement provides a alternating voltage source which has as its frequency determining element the motor 10 itself. As such the frequency of the alternating voltage fluctuates according to the periodic changing of the ground mode of the motor, whereby the phase shift between the current and the voltage stays constant. For the measurement of the frequency all three mentioned possibilities may be used.

Thanks to the inventive solution, it is thus possible to obtain information relative to the rotor position, and in particular relative to the rotor revs via the voltage connection thanks to a simple measuring arrangement. The inventive solution allows for a long lifetime expectancy, comprises only few and simple parts and does not require additional place in the motor itself. The voltage supply and measuring arrangement which is exterior to the motor does not require any important energy consumption, so that it hardly has any influence on the operation efficiency of the motor, and it may be manufactured in a very simple and cheap manner.

It is also possible, to have instead of slits 24a–c respectively 24' certain drill holes. Shape criteria are determined principally by the resulting change of the locally observed acoustic impedance spectrum. In principal, the more distinct is this change, the thinner is inner motor region 26a–c respectively 26' and the more the slits 24a–c respectively 24' extend, i.e. the smaller the widths 29a–c respectively 29', and the larger the angle 30a–c respectively 30'. In the case that angles 30a–c respectively 30' of slit 24a–c respectively 24' are substantially larger than the angles 31a–c respectively 31' of solid material regions 25a–c respectively 25', the influence of the latter on the electrical impedance spectrum will be reduced. With the in FIG. 1 shown solution, slits 24a–c respectively 24' as well as solid material regions 25a–c respectively 25' advantageously extend along the same angle of 60°.

In both examples shown, the information about the rotor position respectively its revs is determined by only two different acoustic, respectively electrical impedance spectrum, because push-portions 19a–c either are in the vicinity of slits 24a–c respectively 24' or of solid material region 25a–c respectively 25'. Accordingly, a rotor may be provided, which is itself provided with the same number of slits as is rotor 20 of FIG. 1, these slits however being arranged in a specific manner. All these slits as well as two of the three there inbetween lying solid material regions extend along an angle of about 50°. The third solid material region extends on the contrary along an angle of 110°. Due to this arrangement of the rotor, one resonance tooth after the other comes across the influence area of a slit. The resonance tooth which first comes across the influence area of a slit, will also leaves this area as the first. As such, a stepwise influence of the electric impedance spectrum results, whereby the following states occur one after the other: no resonance tooth in the vicinity of slits, then only a first, then the first and a second, then all three, then the second and the third, then only the third and then again none.

These seven states occur sequentially three times during a rotation. The effect is thus an increased resolution. This is, contrary to the one in FIG. 1 which is 1:3, 1:21. Due to this arrangement of the rotor, i.e. because of the proposed angle of the slits and of the solid material regions, both the slits as well as the solid material regions have an equal influence on the electric impedance spectrum. The third solid material region forms an exception as it has a longer influence on the electric impedance spectrum which is thus more distinct.

In order to increase the resolution, a plurality of slits or holes may be provided in the rotor, for example 12 slits and 12 solid material regions, which each extend along 15°.

In principal, the outer rotor region 27a–c respectively 27' may be omitted so that the slits 24a–c respectively 24' are open on the outer side and thus take on the form of grooves.

So as to obtain an increased stability, it is possible to provide the slits or the grooves with a different material, either partly or entirely. This material must have a vibration behaviour which is clearly different from that of the rotor 20 respectively 20'.

In all shown propositions, the rotor position respectively the rotor number of revolutions is determined via the supply connections of the piezoceramic excitor 15. It is, however, also possible to have an additional probe provided on rotor 20 respectively 20', which constantly registers during the operation the vibration behaviour of the rotor 20 respectively 20' and transforms this into an equivalent varying alternating voltage signal, which may be interpreted by a responsive circuit as a rotor position change.

The inventive solution further allows to determine the rotor speed of a linear motor.

Thanks to the above-mentioned advantages, the inventive motor may be used in a wristwatch. The time adjustment of such a watch with such a motor may be performed easily by an appropriate circuit arrangement associated with the crown.

What we claim is:

1. A piezoelectric motor having a stator and a ring-shaped rotor rotatable about the stator, a supply and measurement circuit including electrical connection leads for supplying an energizing signal, the stator having a piezoelectric element, responsive to said energizing signal, for generating vibration waves which set an active portion of an active region of the stator into cyclic motion, said active portion engaging a surface of said rotor to effect relative movement between the stator and the rotor, said rotor having several zones arranged substantially along said surface, said zones including a first zone having a first acoustic impedance spectrum and a second zone having a second acoustic impedance spectrum, which is different from the first acoustic impedance spectrum, the difference between the first and the second acoustic impedance spectrum causing said motor to exhibit on said electrical connection leads an electrical variable which varies according to the relative position between the stator and the rotor, said supply and measurement circuit comprising means responsive to said electrical variable on said electrical connection leads for determining the position of the rotor relative to the stator.

2. A piezoelectric motor according to claim 1, wherein the first zone and the second zone differ in at least one physical characteristic of the group of physical characteristics consisting of elasticity and inertia.

3. A piezoelectric motor according to claim 2, wherein the first zone and the second zone each have a wall thickness which differs from the other.

4. A piezoelectric motor according to claim 3, wherein said first zone adjoins an open space.

5. A piezoelectric motor according to claim 4, wherein said open space is formed by a slit which traverses the rotor and which extends at a substantially constant distance along the passive portion.

6. A piezoelectric motor according to claim 1, wherein the first zone extends along a first angle and the second zone extends along a second angle, the first and second angles being substantially similar.

7. A piezoelectric motor according to claim 1, wherein the rotor has a substantially inner cylinder jacket-shaped trailing surface.

8. A piezoelectric motor according to claim 1, wherein the stator has resonance wings extending outwardly.

9. A piezoelectric motor according to claim 8 wherein said stator has three resonance wings.

10. A piezoelectric motor according to claim 8 wherein each resonance wing has an outwardly pointing chisel-shaped resonance tooth.

11. A piezoelectric motor according to claim 1, wherein the supply and measurement circuit comprises an open loop circuit for determining at a fixed frequency via said electrical connection leads one of the variables of the group of variables consisting of the voltage and the current as said electrical variable, said electrical variable exhibiting a non-uniform periodical time change which is interpreted as a changing relative position between the stator and the rotor.

12. A piezoelectric motor according to claim 1, wherein the supply and measuring circuit comprises a closed loop circuit for controlling the frequency of said energizing signal according to a phase shift difference existing between a voltage and a current on said electrical connection leads, said supply and measurement circuit including means interpreting a non-uniform periodical time change of the frequency as a changing relative position between the stator and the rotor.

13. A piezoelectric motor according to claim 1, wherein said motor, in its state of operation, with the stator generating vibrations in the ultrasound frequency region, provides an operational frequency, and the supply and measurement circuit includes means interpreting a non-uniform periodical time change of the operational frequency as a change of the relative position between the stator and the rotor.

* * * * *